(12) United States Patent
Herke et al.

(10) Patent No.: US 10,471,837 B2
(45) Date of Patent: Nov. 12, 2019

(54) METHOD FOR CHARGING A DIRECT CURRENT TRACTION BATTERY AT A DIRECT CURRENT CHARGING PILLAR

(71) Applicant: Dr. Ing. h.c. F. Porsche Aktiengesellschaft, Stuttgart (DE)

(72) Inventors: Dirk Herke, Kirchheim unter Teck (DE); Daniel Spesser, Illingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 335 days.

(21) Appl. No.: 15/006,175

(22) Filed: Jan. 26, 2016

(65) Prior Publication Data

US 2016/0214493 A1 Jul. 28, 2016

(30) Foreign Application Priority Data

Jan. 28, 2015 (DE) .................. 10 2015 101 187

(51) Int. Cl.
 *B60L 53/10* (2019.01)
 *B60L 11/18* (2006.01)
 (Continued)

(52) U.S. Cl.
 CPC ............ *B60L 11/1848* (2013.01); *B60L 53/11* (2019.02); *B60L 53/14* (2019.02); *B60L 53/30* (2019.02); *B60L 53/665* (2019.02); *B60L 58/12* (2019.02); *H02J 7/0027* (2013.01); *H02J 7/022* (2013.01); *B60L 2210/10* (2013.01); *B60L 2210/14* (2013.01); *B60L 2210/30* (2013.01); *B60L 2240/547* (2013.01); *B60L 2240/549* (2013.01); *B60L 2240/80* (2013.01); *Y02T 10/705* (2013.01); *Y02T 10/7005* (2013.01); *Y02T 10/7044* (2013.01); *Y02T 10/7055* (2013.01); *Y02T 10/7072* (2013.01); *Y02T 10/7216* (2013.01); *Y02T 10/7225* (2013.01);
 (Continued)

(58) Field of Classification Search
 None
 See application file for complete search history.

(56) References Cited

U.S. PATENT DOCUMENTS

| | | | |
|---|---|---|---|
| 8,773,065 | B2 | 7/2014 | Ang |
| 2005/0101263 | A1 | 5/2005 | Kim |

(Continued)

FOREIGN PATENT DOCUMENTS

| | | |
|---|---|---|
| CN | 1625076 A | 6/2005 |
| CN | 103209856 A | 7/2013 |

(Continued)

OTHER PUBLICATIONS

Chinese Office Action dated Jan. 19, 2018.

*Primary Examiner* — Robert Grant
*Assistant Examiner* — Tynese V McDaniel
(74) *Attorney, Agent, or Firm* — Gerald E. Hespos; Michael J. Porco; Matthew T. Hespos

(57) ABSTRACT

A high-voltage charge booster is provided for charging a direct current traction battery at a direct current charging pillar. The high-voltage charge booster has a converter (14) for transforming the first voltage level into the second voltage level if the first voltage level differs from the second voltage level. A bypass (16) bypasses the converter (14) or connects through a power stage if the first voltage level corresponds to the second voltage level.

5 Claims, 2 Drawing Sheets

(51) Int. Cl.
  *H02J 7/00* (2006.01)
  *H02J 7/02* (2016.01)
  *B60L 53/14* (2019.01)
  *B60L 53/30* (2019.01)
  *B60L 53/66* (2019.01)
  *B60L 58/12* (2019.01)

(52) U.S. Cl.
  CPC ........ *Y02T 10/7241* (2013.01); *Y02T 10/7258* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(56) References Cited

U.S. PATENT DOCUMENTS

| | | | | |
|---|---|---|---|---|
| 2008/0231233 A1* | 9/2008 | Thornton | ................ | G06F 1/263 320/137 |
| 2009/0133943 A1* | 5/2009 | Noguchi | ................ | B60K 1/04 180/65.21 |
| 2010/0097031 A1* | 4/2010 | King | ................ | B60L 11/1803 320/109 |
| 2011/0115425 A1* | 5/2011 | Olsson | ................ | B60L 3/0046 320/101 |
| 2011/0291616 A1* | 12/2011 | Kim | ................ | B60L 3/003 320/109 |
| 2012/0038324 A1* | 2/2012 | Humphrey | ............ | B60L 3/0069 320/138 |
| 2013/0147431 A1* | 6/2013 | Lim | ................ | H02J 7/022 320/109 |
| 2013/0221921 A1* | 8/2013 | Ang | ................ | B60L 11/1811 320/109 |
| 2013/0235631 A1* | 9/2013 | Pahlevaninezhad | .... | H02M 1/42 363/126 |
| 2014/0347018 A1* | 11/2014 | Boblett | ................ | B60L 11/1838 320/162 |
| 2015/0137751 A1* | 5/2015 | King | ................ | B60L 11/1818 320/109 |
| 2015/0137755 A1* | 5/2015 | Sadano | ................ | B60L 11/1818 320/109 |
| 2015/0303731 A1* | 10/2015 | Takahashi | ................ | H02J 3/32 320/127 |
| 2016/0152129 A1* | 6/2016 | West | ................ | B60L 5/36 307/10.1 |
| 2016/0304041 A1* | 10/2016 | Lennevi | ................ | B60L 50/10 |

FOREIGN PATENT DOCUMENTS

CN   103944198 A   7/2014
KR   1020130045708 A   5/2013

* cited by examiner

METHOD FOR CHARGING A DIRECT CURRENT TRACTION BATTERY AT A DIRECT CURRENT CHARGING PILLAR

CROSS REFERENCE TO RELATED APPLICATION

This application claims priority under 35 USC 119 to German Patent Appl. No. 10 2015 101 187.5 filed on Jan. 28, 2015, the entire disclosure of which is incorporated herein by reference.

BACKGROUND

1. Field of the Invention

The invention relates to a high-voltage charge booster for charging a direct current traction battery at a direct current charging pillar. The invention also relates to a corresponding electric vehicle, method, computer program and storage medium.

2. Description of the Related Art

The prior art comprises electric vehicles having a direct current traction battery with, for example, a direct current voltage level of 800 V. The electric vehicle is connected inductively or by a cable to a stationary alternating current power system via a charging pillar to charge the traction battery. Charging then can be carried out directly with direct current when an AC/DC converter is integrated into the charging pillar. Alternating current can be used for charging, but requires an AC/DC converter integrated into the electric vehicle.

US 2008/0215200 A1 discloses a control system and hybrid vehicles with re-configurable multifunction power inverter. This document also describes an actuation method for charging with alternating current.

US 2010/0231169 A1 explains general energy conversion on the basis of a charging voltage of, for example, 450 V with different high voltages in an electric vehicle.

US 2011/0148353 A1 relates to a device and to a method for rapidly charging by means of divided power electronics and describes primarily the design of direct current charging pillars whose direct current bus is fed by the energy conversion of an alternating current.

US 2012/0049794 A1 discloses an AC charging device that supplies two high-voltage batteries.

SUMMARY

The invention provides a high-voltage charge booster for charging a direct current traction battery at a direct current charging pillar, a corresponding electric vehicle, a method, computer program and storage medium.

An advantage of the invention is its independence from the design of an 800 V infrastructure and relevant country-specific and political decisions. This independence is achieved by using an existing 400 V infrastructure. In this way, the invention is capable of deciding in a universally intelligent fashion that charging compatibility will be ensured in the next few years on a worldwide basis.

The invention is based on the realization that it is possible to decide automatically between a direct voltage of 400 V and one of 800 V and that if 400 V is present, it is possible to switch over automatically by a switching matrix and to activate a converter. Alternatively, it is possible to charge even more quickly in parallel on a new 800 V infrastructure.

A non-electrically isolated, bidirectional converter with selectable direction of power flow and a voltage range of the feeding direct current infrastructure between 200 and 700 V is considered. The voltage range can be bypassed when an 800 V infrastructure is present or can be switched to a passive state by connecting through the power stage in favor of a direct charging process. The output voltage at the high-voltage battery is above the input voltage between 450 and 950 V given a ripple of less than 1% and is controlled by internal voltage regulation and current regulation by software.

The converter can be configured so that, given a power of up to 200 kW and above, the booster charges the traction battery with an output current between 175 A and 200 A if the charging pillar feeds the booster with an input current between 330 A and 350 A, the first voltage level is between 200 V and 600 V, and the second voltage level is 700 to 900 V, wherein future embodiments may support significantly higher voltage levels. In this way, a maximum utilization of the 400 V charging infrastructure is achieved by constant charging with up to 450 V, and with the charging time being correspondingly reduced with respect to conventional AC charging. In this context, the independence of the increase in the voltage is maintained by the high-voltage battery via its state of charge, which corresponds to a power advantage of 25 kW given a charging current of 350 A.

The booster may have a volumetric capacity of less than 6 l. The required installation space therefore corresponds to that of an 11 kW on-board charging device, which opens up many possible supply options with respect to correspondingly equipped vehicles. A vehicle can be retrofitted to 22 kW alternating current charging in a neutral way in terms of installation space given an 800 V infrastructure which is provided extensively.

An exemplary embodiment of the invention is presented in the drawings and will be described in more detail below.

DETAILED DESCRIPTION

Figure 1:
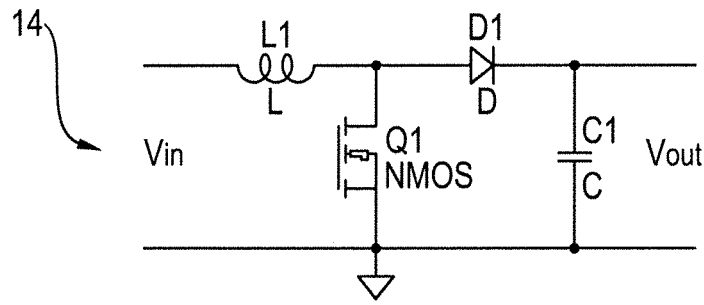
FIG. 1 shows the circuit diagram of a device for charging a traction battery at a direct current charging pillar given a voltage level of 400 V.

FIG. 1 illustrates the requirements of an electric vehicle with respect to the charging of a traction battery 12 at a direct current charging pillar given a voltage level of 400 V. The relevant configuration criteria comprise a power of 150 kW for transforming the first voltage level Vin of 450 V of a direct current charging pillar into a second voltage level Vout between 600 V and 900 V, in particular of 800 V. In this case, on the 450 V side there is a resulting input current of 333 A, which suggests configuration for 350 A, while on the 800 V side an output current of 175 A occurs.

The converter 14 shown in FIG. 1 essentially satisfies the specified requirements. The question as to the implementation of a bypass for 800 V remains open.

Figure 2:
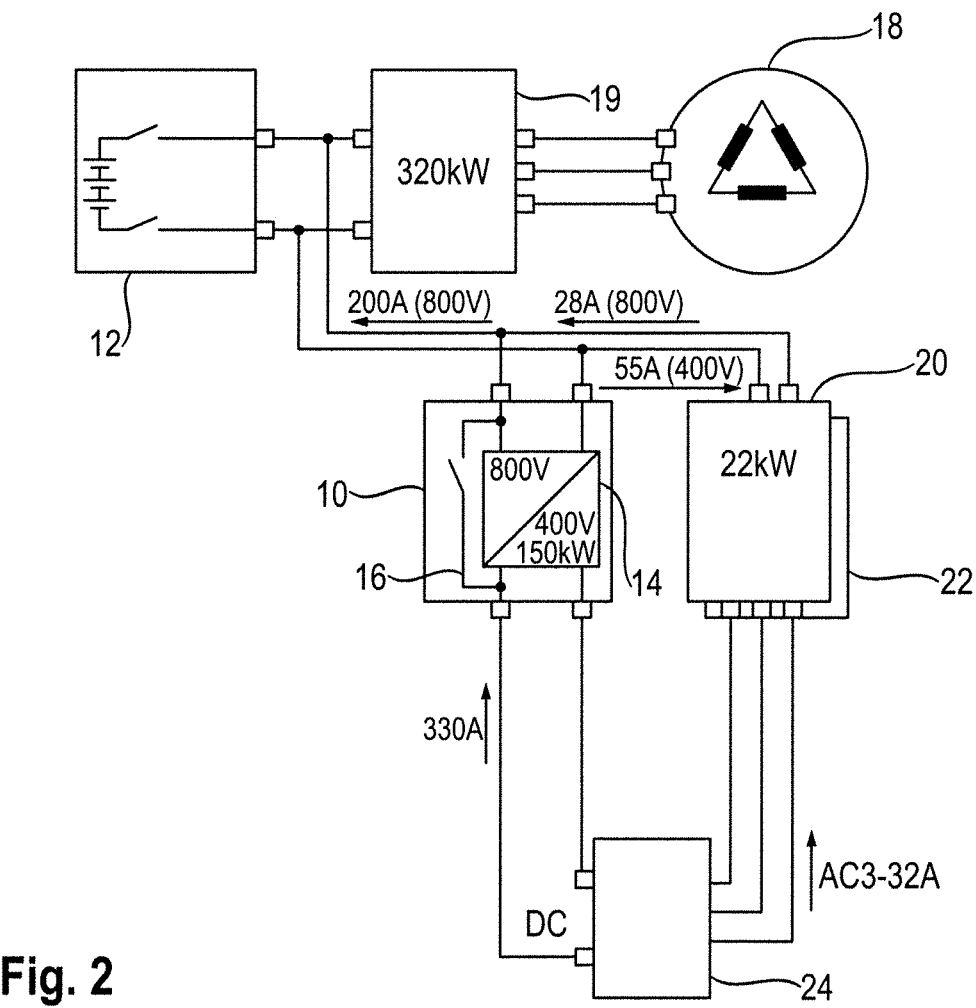
FIG. 2 shows the system overview of a 400 V booster according to one embodiment of the invention.

The inventive high-voltage charge booster 10 of FIG. 2 comprises such a bypass 16 that electrically bypasses the converter 14 if the first voltage level Vin of the charging pillar corresponds to the second voltage level Vout of the traction battery 12. On the other hand, if the first voltage level Vin differs from the second voltage level Vout, the converter 14 is not bypassed by the bypass 16, but instead transforms the first voltage level Vin into the second voltage level Vout. This would have to be assumed, for example, in the switch position of the bypass 16 according to the FIG. 2, in which switch position the charging pillar feeds the booster 10 with an input current between 330 A and 350 A, and the first voltage level Vin is between 400 V and 450 V, and the second voltage level Vout is 800 V. In this scenario, given a power of 150 kW the booster 10 charges the traction battery 12 with an output current of up to 200 A, with the result that the traction battery 12 feeds the electric motor 18 of the electric vehicle 10, 12, 18, 19, 20, 22, 24 (not illustrated in its entirety) via its rear power electronics 19.

In addition to the components already mentioned, the electric vehicle 10, 12, 18, 19, 20, 22, 24 comprises two on-board charging devices 20, 22, which, given a respective power of 11 kW, charge the traction battery 12 with an output current of 28 A if a correspondingly configured alternating current charging socket supplies the on-board charging device 20, 22 via its charging socket 24 with a three-phase input current of up to 32 A.

Figure 3:
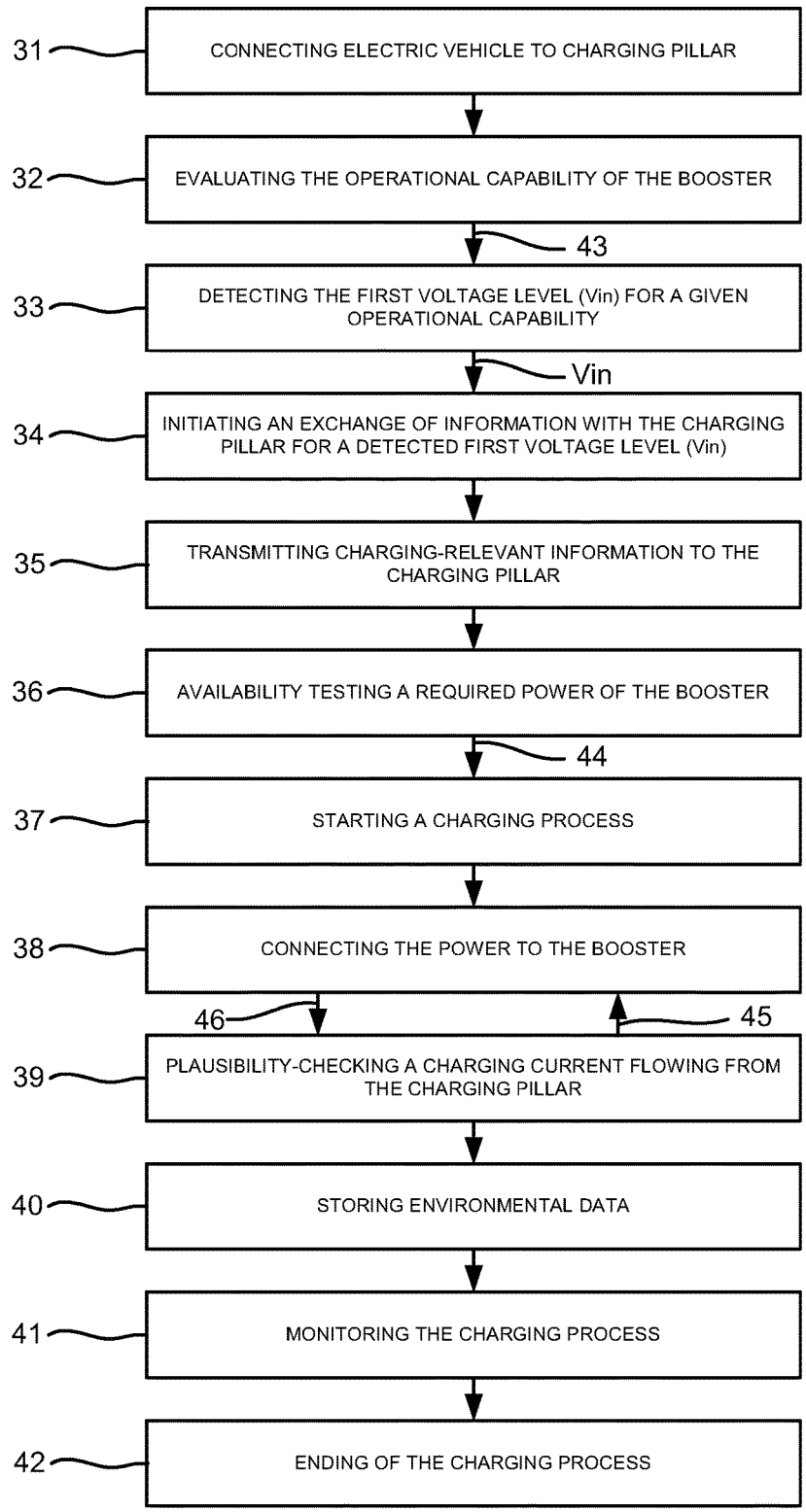
FIG. 3 shows the program flow chart of a computer program according to a further embodiment of the invention.

The method for charging the explained electric vehicle 10, 12, 18, 19, 20, 22, 24 at a direct current charging pillar with a first direct current voltage level of 400 V will now be explained with reference to the sequencing control which is outlined by FIG. 3 and which may be located either in the on-board charging device 20, 22 or in the booster 10. The corresponding software function comprises for this purpose a first software module for boost control, a second software module for detection and plausibility-checking of the boost operation, a third software module for evaluating the actual state of the relevant components, a fourth software module for boost derating, a fifth software module for activating the boost contactor, a sixth software module for PLC boost control with the charging infrastructure, a seventh software module for plausibility-checking of the charging currents, an eighth software module for historical values and a ninth software module for ending the boosting.

In a first method step 31, the electric vehicle 10, 12, 18, 19, 20, 22, 24 is connected here to a 400 V direct current infrastructure. In a second method step 32, the third software module evaluates whether the 800 V booster 10 is operationally capable. In the case of proven operational capability 43, the sixth software module then evaluates in a third method step 33 whether a 400 V or 800 V charging pillar is connected to the electric vehicle 10, 12, 18, 19, 20, 22, 24.

If this evaluation leads to the detection of a first voltage level Vin of 400 V, the PLC starts, in a fourth method step 34, to exchange all the charging-relevant information. In a fifth method step 35, the first software module calculates all the direct-current-charging-relevant information and transmits it to the infrastructure. For example a setpoint current or a setpoint voltage are considered. The fourth software module then checks, in a sixth method step 36, whether the calculated power can be transmitted by the 800 V booster 10. If the satisfactory checking reveals that this power can be transmitted without restriction 44, the fourth software module starts the charging process in a seventh method step 37.

In an eighth method step 38, the fifth software module controls the switching of the contactor for the connection of power to the 800 V booster 10 and is subject in the process to monitoring 45 by the fourth software module. During the conversion 46 of energy to the second voltage level Vout of 800 V, performed by the 800 V booster 10, in a ninth method step 39 the seventh software module checks the plausibility of the charging currents which are signaled by the sixth software module of the infrastructure, with respect to the actual values of the 800 V booster 10. In a tenth method step 40, the eighth software module starts and stores all the environmental data.

The second software module which is, as it were, entrusted with a "watchdog function" monitors, for its part, the entire charging operation in parallel in an eleventh method step 41 and manages the first software module, third software module, fourth software module, fifth software module, sixth software module, seventh software module and eighth software module, until finally, in a twelfth method step 42, the ninth software module ends the charging process by means of radio remote control, a keypad or touch pad or the charging infrastructure itself.

What is claimed is:

1. A method for charging an electric vehicle at a charging pillar with a first voltage level ($V_{in}$) of 400 V, comprising:
    connecting the electric vehicle to the charging pillar, the electric vehicle comprising:
      an electric motor for driving the electric vehicle,
      a traction battery for feeding the electric motor, the traction battery having a second voltage level ($V_{out}$),
      a charging socket for receiving direct current voltage or alternating current voltage from the charging pillar,
      at least one on-board charging device for charging the traction battery at the second voltage level ($V_{out}$) if the charging socket receives alternating current voltage from the charging pillar,
      a high-voltage charge booster for charging the traction battery if the charging socket receives direct current voltage from the charging pillar, wherein the at least one on-board charging device and the high-voltage charge booster are coupled in parallel with each other between the charging socket and the traction battery, the high-voltage charge booster comprising:
        a converter for transforming the first voltage level ($V_{in}$) into the second voltage level ($V_{out}$) if the first voltage level ($V_{in}$) differs from the second voltage level ($V_{out}$) such that the traction battery is charged by the output of the converter, and
        a bypass for bypassing the converter if the first voltage level ($V_{in}$) corresponds to the second voltage level ($V_{out}$) such that the traction battery is charged directly from the charging pillar,
      an on-board computer connected by cable to the high-voltage charge booster,
    evaluating the operational capability of the high-voltage charge booster,
    detecting the first voltage level ($V_{in}$) for a given operational capability,
    initiating an exchange of information with the charging pillar for a detected first voltage level ($V_{in}$),
    transmitting charging-relevant information to the charging pillar,
    availability-testing a required power of the high-voltage charge booster,
    starting a charging process,
    connecting the power to the high-voltage charge booster,
    plausibility-checking a charging current flowing from the charging pillar,
    storing environmental data,
    monitoring the charging process, and
    ending the charging process.

2. The method of claim 1, wherein:
    the transmitting of the charging-relevant information is carried out by a first software module for controlling the charging process, the monitoring of the charging process is carried out by a second software module for detecting and checking the plausibility of the charging process, the evaluation of the operational capability is carried out by a third software module for evaluating an actual state, the availability-checking of the power and recording of the charging process are carried out by means of a fourth software module for throttling the charging process, the connecting of the power is carried out by a fifth software module for switching over a contactor, the detecting of the first voltage level ($V_{in}$) is carried out by a sixth software module for communicating with the charging pillar, the plausibility-checking of the charging currents is carried out by a seventh software module for checking the plausibility of the charging currents, the storing of the environmental data is carried out by an eighth software module for storing historical data, and the ending of the charging process is carried out by a ninth software module for ending the charging process.

3. The method of claim 2, wherein the software modules include software functions that are performed in the at least one on-board charging device or in the high-voltage charge booster.

4. A computer program configured to carry out the steps of the method of claim 1.

5. A machine-readable storage medium storing the computer program of claim 4.

* * * * *